US012601679B2

(12) United States Patent (10) Patent No.: US 12,601,679 B2
Zarrella et al. (45) Date of Patent: Apr. 14, 2026

(54) ON-LINE MONITORING OF SYNTHESIS REACTIONS

(71) Applicant: PROTEIN TECHNOLOGIES, INC., Tucson, AZ (US)

(72) Inventors: Anthony Zarrella, Tucson, AZ (US); Scott Harlow, Tucson, AZ (US)

(73) Assignee: Protein Technologies, Inc., Tucson, AZ (US)

( * ) Notice: Subject to any disclaimer, the term of this patent is extended or adjusted under 35 U.S.C. 154(b) by 0 days.

(21) Appl. No.: 19/285,765

(22) Filed: Jul. 30, 2025

(65) Prior Publication Data

US 2025/0354923 A1 Nov. 20, 2025

Related U.S. Application Data

(60) Division of application No. 18/921,940, filed on Oct. 21, 2024, now Pat. No. 12,399,112, which is a continuation of application No. PCT/US2024/052212, filed on Oct. 21, 2024.

(60) Provisional application No. 63/592,378, filed on Oct. 23, 2023.

(51) Int. Cl.
| | |
|---|---|
| *G01N 21/33* | (2006.01) |
| *B01J 19/00* | (2006.01) |
| *G01N 21/75* | (2006.01) |

(52) U.S. Cl.
CPC .......... *G01N 21/33* (2013.01); *B01J 19/0046* (2013.01); *G01N 21/75* (2013.01); *B01J 2219/00686* (2013.01); *B01J 2219/00698* (2013.01); *B01J 2219/00725* (2013.01); *G01N 2021/752* (2013.01)

(58) Field of Classification Search
None
See application file for complete search history.

(56) References Cited

U.S. PATENT DOCUMENTS

| | | | |
|---|---|---|---|
| 5,714,127 | A | 2/1998 | DeWitt et al. |
| 6,372,428 | B1 | 4/2002 | Nova et al. |
| 8,535,947 | B2 | 9/2013 | Menakuru et al. |
| 2018/0057525 | A1 | 3/2018 | Simon et al. |

OTHER PUBLICATIONS

PCT International Search Report and Written Opinion, PCT/US2024/052212, Feb. 3, 2025, 13 pages.

*Primary Examiner* — Maris R Kessel
*Assistant Examiner* — Mickey Huang
(74) *Attorney, Agent, or Firm* — Quarles & Brady LLP; Yakov S. Sidorin

(57) ABSTRACT

Methodology and apparatus for on-line UV monitoring of automated synthesis reactions. An apparatus includes a module with a fluidic cell the operational parameters of which remain substantially unchangeable not only during the process of monitoring but also in time between sequential processes. The module includes a separable housing structure containing a source of UV-light and an optical detector integrated with substantially temperature-insensitive fluidic cell. A portion of the cell is defined by a slot formed in a cell-chassis and complemented with inlet and outlet dimensioned to ensure that no air-bubble(s) and/or stagnating fluid is present in the cell during time when liquid reactants to-be-measured are delivered through the inlet into the cell. The method is configured to determine progression and completion of the reaction(s) and modification of reactions' times and repetitions of reaction(s) in real time.

16 Claims, 10 Drawing Sheets

100

MODULE     100

TOP HOUSING
ASSEMBLY
108A

CHASSIS ASSEMBLY
104

BOTTOM HOUSING ASSEMBLY
108B

MAP

LOST?
YOU ARE
HERE

MODULE (CONT'D)

LED SOURCE
110

FLOW PATH/
CELL OR CHAMBER
122

128B

DETECTOR
114

.0625" LIGHT PATH

118

128A

132A

132B

128B

122

128A

100

MAP

LOST?
YOU ARE
HERE

100

.600" (15.24MM)
CLEARANCE BETWEEN LED
AND THROUGH HOLE

.0245" CLEARANCE
BETWEEN DETECTOR
AND GLASS PLATE

104

CHASSIS ASSEMBLY

UV SIGHT GLASS CAP
420

SEALING GASKET
416

FUSED QUARTZ/
QUARTZ GLASS PLATE
408

UV FLOW CELL CHASSIS
404

MEMBRANE GASKET
412

UV SIGHT GLASS CAP

128B

122

124

104

CHASSIS ASSEMBLY

WASHER CUTOUT

420

WASHER POSITION FLANGE

420

CLEARANCE HOLE FOR LED/DETECTOR 110

UV SIGHT GLASS CAP

2X #6 CLEARANCE SLOTS

6X #6 COUNTERSINK HOLES

UV SIGHT GLASS CAP (CONT'D)

| # | FEATURE | REASONING |
|---|---------|-----------|
| 1 | 6X #6 CLEARANCE HOLES AND SPACING | EQUAL COMPRESSION ON THE SEALING WASHER |
| 2 | 2X #6 CLEARANCE SLOTS | PROVIDE ACCESS TO THREADED HOLES ON THE CHASSIS IN ORDER TO COMPRESS GASKET EQUALLY IN THOSE AREAS AS WELL |
| 3 | CLEARANCE HOLE FOR LED/ DETECTOR | .400" HOLE WILL PROVIDE ENOUGH CLEARANCE FOR THE LED AND DETECTOR WHICH HAS A MAXIMUM DIAMETER OF .370" +.020" TAB (DETECTOR) |
| 4 | SEALING WASHER OUTOUT | USING 91367A961 CHEMICAL RESISTANCE WASHER. THICKNESS IS .083" - .103". DEPTH OF CUTOUT IS .060" WHICH WOULD RESULT IN A .023" - .043" COMPRESSION OF SEALING WASHER |
| 5 | WASHER POSITION FLANGE | USING 91367A961. CHEMICAL RESISTANCE WASHER. THE ID IS .355" SO THE OD OF THE FLANGE IS .345" AND ID OF FLANGE IS .300" WHICH PROVIDES .005" CLEARANCE FROM WASHER AND .0225" WALL |
| 6 | CROSS CUTOUT ON POSITION FLANGE | PROVIDE CLEARANCE FOR LIGHT TO BE UNRESTRICTED ABOVE FLOW PATH |
| 7 | OVERSIZED COUNTERSINK | ENSURE THE SCREWS WILL BE BELOW THE SURFACE |
| 8 | THICKNESS OF MATERIAL | 3/16" (.1875) STANDARD GAUGE THICKNESS STEEL PLATE |

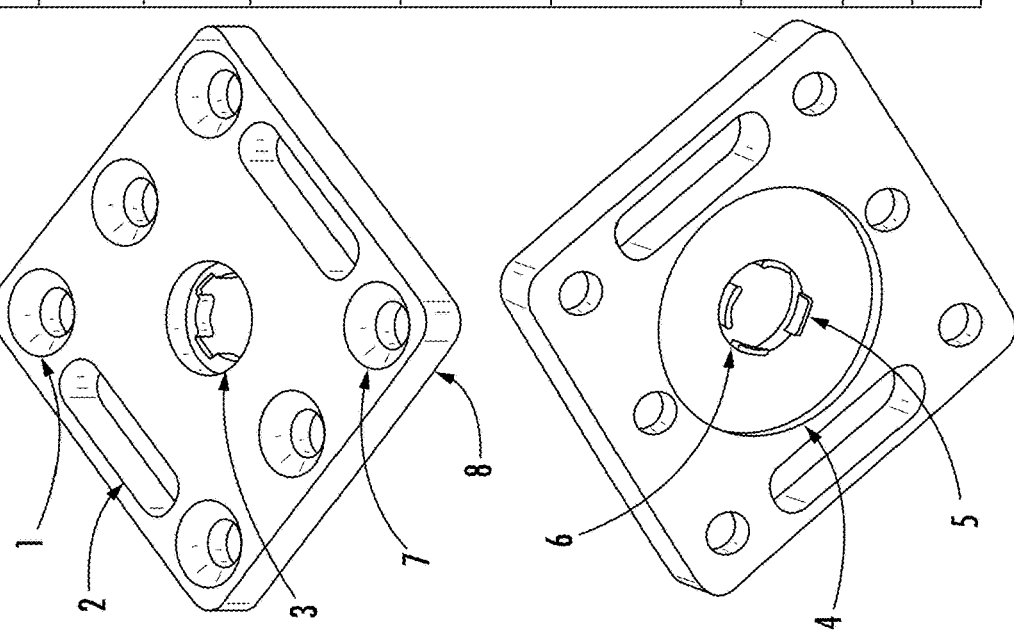

FIG. 5C

UV FLOW CELL CHASSIS

MEMBRANE WASHER LOCATING FEATURES (CLOCKS FEP MEMBRANE DURING ASSEMBLY, MAINTAINS ORIENTATION)

2X SIGHT GLASS CUTOUTS

2X UPCHURCH HOLES WITH INLET/OUTLET THROUGH HOLES (FLUID IN/OUT)

404

118

124

FLOW SLOT (CONFIGURED TO ENSURE THE OVERALL FLOW CHAMBER IS FULLY FILLED, PATH LENGTH IS TUNED TO ELIMINATE SENSOR SATURATION)
122

UV FLOW CELL CHASSIS (CONT'D)

| # | FEATURE | REASONING |
|---|---------|-----------|
| 1 | 10X #6 CLEARANCE HOLES AND SPACING | 6 THREADED HOLES FOR THE SIGHT GLASS CAP. THE OTHER FOUR I PLAN TO USE TO SECURE THE LED AND DETECTOR BOARD ASSEMBLIES WITH PLASTIC COVERS. THE FOUR MOUTNING HOLES SHOULD CAUSE FURTHER EQUAL COMPRESSION OF THE SEALING WASHER. THESE FOUR HOLES ARE NOT |
| 2 | MEMBRANE LOCATING FEATURES | THE MEMBRANE VIEWING CUTOUT IS NOW ORIENTATION SPECIFIC. THESE FEATURES WILL LOCATE THE MEMBRANE PROPERLY |
| 3 | FLOW CHAMBER | SLOT WITH CENTRAL .070 FILL CHAMBER, DERIVED EMPIRICALLY TO ENSURE CONSISTENT CHAMBER FILLS. CENTRAL SLOT IS MORE NARROW THAN INLET/OUTLET HOLES TO CHOKE FLOW, ENSURE EVEN FILING. |
| 4 | UPCHURCH FITTINGS AND INLET AND OUTLET FLOW TUBE | THE INLET AND OUTLET DIAMETERS ARE 1/32", UPCHURCH FITTINGS FOR FLUIDIC CONNECTIONS |
| 5 | SIGHT GLASS CUTOUTS | USING 1357T45 WHICH IS .75" DIAMETER WITH A -.010" TO .010" TOLERANCE. THE DIAMETER OF THE CUTOUT IS .76". THE THICKNESS OF THE GLASS IS 1/8" SO THE DEPTH OF THE CHAMER IS SET TO .130" TO BE SLIGHTLY BELOW THE SURFACE. THE SEALING WASHER WILL HAVE .023" - .043" SO THERE SHOULD BE NO ISSUE WITH SEALING. THE DECISION TO KEEP IT BELOW THE TOP SURFACE IS TO ACCOUNT FOR SIGHT TOLERANCE |

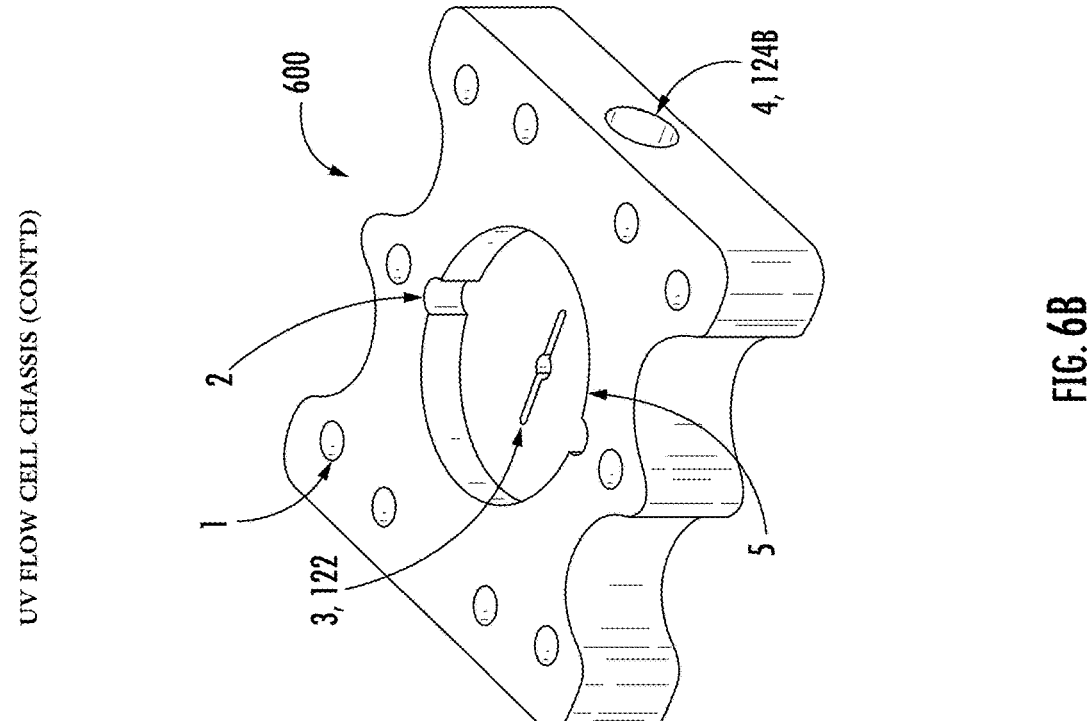

FIG. 6B

ON-LINE MONITORING OF SYNTHESIS REACTIONS

CROSS-REFERENCE TO RELATED APPLICATIONS

This patent Application in a divisional of U.S. patent application Ser. No. 18/921,940 filed on Oct. 21, 2024 and now published as US 2025/0130163, which claims priority from and benefit of U.S. Provisional Patent Application No. 63/592,378 filed on Oct. 23, 2023. U.S. patent application Ser. No. 18/921,940 is also a continuation of International Patent Application No. PCT/US2024/052212 filed on Oct. 21, 2024, which claims priority from and benefit of U.S. Provisional Patent Application No. 63/592,378 filed on Oct. 23, 2023. The disclosure of each of the above-identified applications is incorporated by reference herein.

TECHNICAL FIELD

The invention relates in general to the process of monitoring of chemical reactions during automated synthesis and, more specifically, to an online system and method for monitoring of, for example, fluorenylmethyloxycarbonyl (Fmoc) deprotection reaction during peptide synthesis and/or coupling reaction during peptide synthesis (the latter being a reaction in which two or more reactants participate in coupling two amino acids, that is the unprotected amine of one reacts with the unprotected carboxylic acid group of the other to form a peptide bond).

RELATED ART

Biological products are often synthesized through automated synthesis. For example, the production of naturally occurring and artificial peptides and proteins commonly carried out with the use of automatic apparatus for solid phase peptide synthesis (SPPS). The general principle of SPPS is one of repeated cycles of coupling and deprotection. In essence, the free N-terminal amine of a peptide attached to a solid-phase support is coupled to the carboxyl end of a single N-terminal protected amino acid. This newly coupled amino acid is then deprotected, revealing a new N-terminal amine to which a further protected amino acid may be attached.

Given that the ultimate yield of a synthesized product depends on the yield of each step of the synthesis process, the coupling of amino acids during SPPS must be highly optimized. Because the extent of deprotection is a crucial parameter in SPPS, it often has to be repeated until "complete," i.e., as much deprotection has to occur as is likely to have the further repetition be wasteful. Thus, various ways of monitoring the extent of the completion of the deprotection reaction have been developed.

For example, Fmoc deprotection has been monitored via conductivity assays. However, it has been found that sensitivity to conductive impurities, among other reasons, can lead to unnecessary repetition of the deprotection reaction and the resulting excess of time, reagent consumption, and lower yield.

A more sensitive approach to monitoring deprotection involves the use of ultraviolet (UV) light at 365 nm to measure the adsorption of the dibenzofulvene-piperidine adduct formed during the deprotection reaction. Unfortunately, this method also has significant drawbacks relating to artificial readings caused by undesired adsorption by other reagents such as triazole-based coupling reagents. Subsequently, the use of UV light at 301 nm to measure the adsorption of deprotection reagents and/or adducts has been found to be more advantageous.

Some of known apparatus and methods of UV monitoring at 301 nm involve the use of a flow cell, UV source, and detector that is external to the synthesizer, and, therefore, rely on moving liquid reagents from the reactor to the detector's flow cell at the conclusion of a deprotection reaction. This requires extra chemical rinsing between UV measurements to clear lines and remove bubbles. In addition, the rate of flow through the cell can affect the measurement accuracy and waiting periods must be observed prior to and after a reading for the values to stabilize. Such extra use of reagents and spending extra time make the method uneconomic at a scale greater than 1.0 mmol. Moreover, because the UV measurements are performed offline (upon conclusion of the deprotection reaction cycle), adjustments cannot be made in real time to the length of deprotection reactions, resulting in longer than necessary reaction times.

Another solution, in which embodiments of UV monitoring devices are integrated proximally to the reaction vessel (in which the deprotection reaction takes place, in the line just below the reaction vessel, is discussed in the U.S. Pat. No. 8,535,947 (the disclosure of which is incorporated by reference herein). There, the reaction fluid was moved a short distance from the reaction vessel to the UV monitoring system at specified time intervals, measured for deprotection progression and completion, and replaced in the reaction vessel. While this close-to-the-reaction vessel structure alleviated some of existing shortcoming of the measurements performed with the systems of related art, the cell or chamber containing the reagents (target fluid) being measured with UV light was structured as a specific tube, the configuration of which led to unavailability of a precise and constant-in-time path length for light-based monitoring and, in addition, to long-term degradation of the optical properties of the chamber.

Thus, there remains a need for on-line monitoring systems and methods to more reliably and repeatably produce synthesized products of high quality and yield.

SUMMARY OF THE INVENTION

The deprotection and/or coupling monitoring systems and methods of invention involve an in-line flow cell, UV source and detector apparatus that makes UV measurements during the deprotection and/or coupling reaction steps such that modification of deprotection/coupling times and repetitions can be carried out in real time. (For the purposes of this disclosure and accompanying claims, a real-time performance of a system is understood as performance that is subject to operational deadlines from a given event to a system's response to that event. For example, a real-time extraction of optical information (such as irradiance and/or phase of light arriving from a target scene) from an optical detection system may be one triggered by the user and executed simultaneously with and without interruption of the process of optical imaging during which such information has been recorded.) This has been achieved through the integration of a UV-light monitoring system, located within the automated synthesizer itself, proximally to the reaction vessel in which the reaction takes place. Thus the reaction fluid is separated only by a short distance from the reaction vessel, thereby leaving most of the liquid still in the vessel for the reaction. Also, no special rinsing is required due to the UV flow cell being in-line with the line through which rinsing reagents for the reactor would normally flow.

In particular, embodiments of the invention provide a method including monitoring (in real time) a deprotection reaction of an Fmoc protecting group in a peptide automated synthesizer. Such monitoring includes at least a step of drawing a fluid that contains dibenzofulvene and related adducts and byproducts from a reaction vessel of the synthesizer into a hollow volume formed in an optically opaque plate of a photometric measurement apparatus of the synthesizer through an inlet passage formed in the optically opaque substrate. (Such hollow volume is limited by (i) first and second walls formed in the optically opaque substrate, wherein planar portions of said walls are substantially parallel to one another to define a slot, and (ii) first and second plane-parallel plates of an optically-transparent material positioned across a top of the first wall and a top of the second wall and configured to connect the first and second walls in a substantially leak-proof manner). The method also includes a step of irradiating the fluid in the hollow volume with UV light delivered along and between the first and second walls from the first plate to the second plate, and a step of acquiring optical data (that represents absorption of the UV light by the fluid in the hollow volume) and determining a rate at which the deprotection reaction is progressing with the use of an optical detector of the photometric apparatus. (The determination of rate is accomplished at least in part by calculating a floating average of a specified number of detector readings.) The method further includes a step of returning the fluid to the reaction vessel unless a reaction completion is indicated when a value of the floating average does not change by more than a preselected value during a user-defined time. The method is configured such that at least delivering of the fluid from the inlet passage is carried out without formation and/or entrapment of air-bubbles in the fluid in the hollow volume.

Embodiments of the invention additionally provide a computer-program product (encoded in a tangible non-transitory computer readable medium) that is usable with a programmable computer processor operably coupled with a peptide automatic synthesizer. Such computer program product contains computer readable program code that on execution causes the programmable processor to carry out the above-identified method.

Additional features and advantages of the invention will be forthcoming from the following detailed description of certain preferred embodiments when read in conjunction with the accompanying drawings.

BRIEF DESCRIPTION OF THE DRAWINGS

The invention will be more fully understood by referring to the following Detailed Description of Specific Embodiments in conjunction with the Drawings, of which:

FIGS. 5A, 5B, 5C provide views and structural description of a cap plate of the chassis assembly of FIGS. 4A, 4B.

FIGS. 6A, 6B present an embodiment of a flow cell chassis portion of the chassis assembly of FIGS. 4A, 4B and related information.

Figures 1A, 1B:
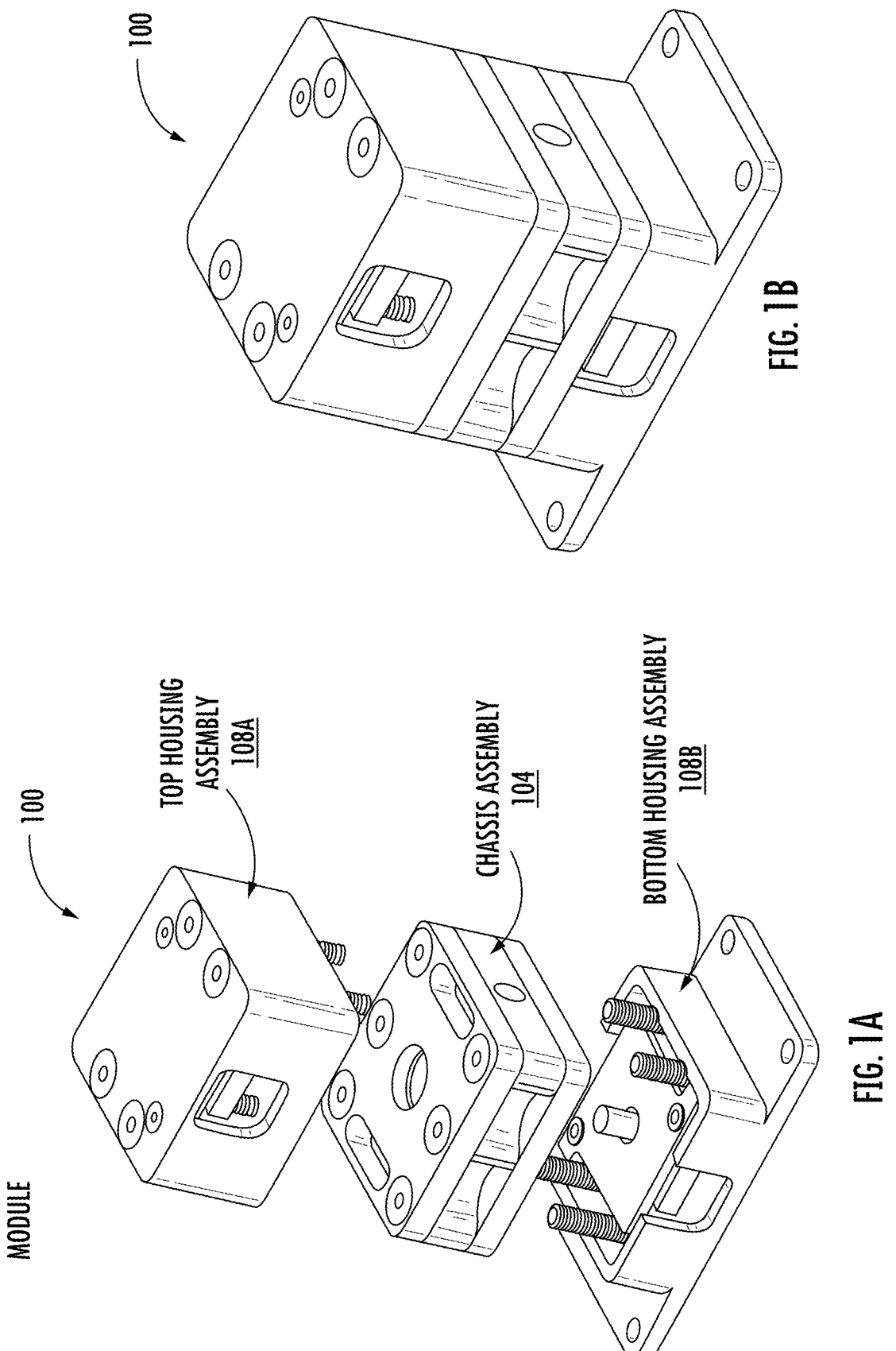
FIGS. 1A and 1B illustrate, in expanded and assembled perspective views, respectively, an embodiment of a photometric apparatus of the invention configured at least for UV deprotection and/or coupling monitoring. The embodiment is shown to include a top housing assembly, a chassis assembly, and a bottom housing assembly.

Generally, like elements or components in different Drawings may be referenced by like numerals or labels and/or the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

For the general description of embodiment(s) of a UV monitoring methodology of deprotection and/or coupling reactions, employed in related art, the reader is referred to the U.S. Pat. No. 8,535,947. The following disclosure addresses an embodiment of the UV measuring device judiciously configured to be used in implementing such methodology in place of that discussed in the '947 patent. Indeed, the use of a UV-light-transmissive tube in the measurement system of the '947 patent proved to possess rather critical operational shortcomings and deficiencies not the last of which stem from the fact that the same UV-transmissive tube was dedicated to be a measurement cell of the UV measurement apparatus and, at the same time, a channel for delivery of deprotection reagents to the measurement cell. As a result of such arrangement, on the one hand, the degradation of or other problem with the UV transmissive tube outside of the housing of the UV measurement apparatus of the system necessarily required the disassembly of the measurement apparatus as well to replace the measurement cell portion of it. On the other hand, the amount of deprotection reagents in the measurement cell of the apparatus of the overall system of the '947 patent was, understandably, defined by the substantially large, and not necessarily controlled at a discretion of the user, inner diameter of such UV-transmissive tube—as a results of which, the monitoring of chemical reactions with the use of the apparatus of related art consumed an unreasonably large quantity of reagents. Furthermore, it was empirically determined that the substantially geometrically-uniform nature of the UV-transmissive tube employed in the apparatus of related art lent itself to formation and/or entrapment of air-bubbles and/or (depending on the value of the inner diameter of the UV-transmissive tune) stagnant fluid in the volume of the measurement chamber of the apparatus, the presence of which inevitably introduces unpredictable errors into the photometric measurement performed with the use of the apparatus. Moreover, due to the nature of the flexible material used in construction of the UV-transmissive tube, the volume of the measurement cell defined by such tube proved to be sensitive and responsive to variations in temperature, while the transmittance of light at a target UV wavelength by the walls of the UV-transmissive tube was changing in time as the tube was degrading, thereby ensuring the unpredictably incorrect measurement results.

The structure of a photometric (or measurement) apparatus proposed and discussed below avoids and/or obviates all these shortcomings and deficiencies not only due to the substantially reduced size of the flow cell or chamber (operationally corresponding to the measurement cell of the '947 patent) but also to the specific geometry of the flow cell and the inlet/outlet portions of such flow cell. Notably, the inlet/outlet of the flow cell are still configured such as to allow the leading and/or outgoing channels of delivery of deprotection reagents—for example, a flexible tube—be attached to the flow cell of the proposed apparatus.

An embodiment of the structural module 100 of the UV measuring device is presented in various views of FIGS. 1A, 1B, 2A, 2B, 2C, 3A, 3B, 3C. The module 100 can be reversibly disassembled and is a separable combination of the chassis assembly 104 with the overall housing structure that includes upper (top) and lower (bottom) housing portions or assemblies 108A, 108B. (A skilled artisan will readily understand that the spatial orientation of the constituent portions of the module 100 can be changed to, for example, horizontal in which the chassis assembly 104 is re-oriented by 90 degrees and is sandwiched between the portions of the housing 108A, 108B from left and right—or in any other applicable orientation. The vertically-oriented spatial coordination of the portions of the module 100 is shown here only as an example.)

Figures 2A, 2B, 2C:
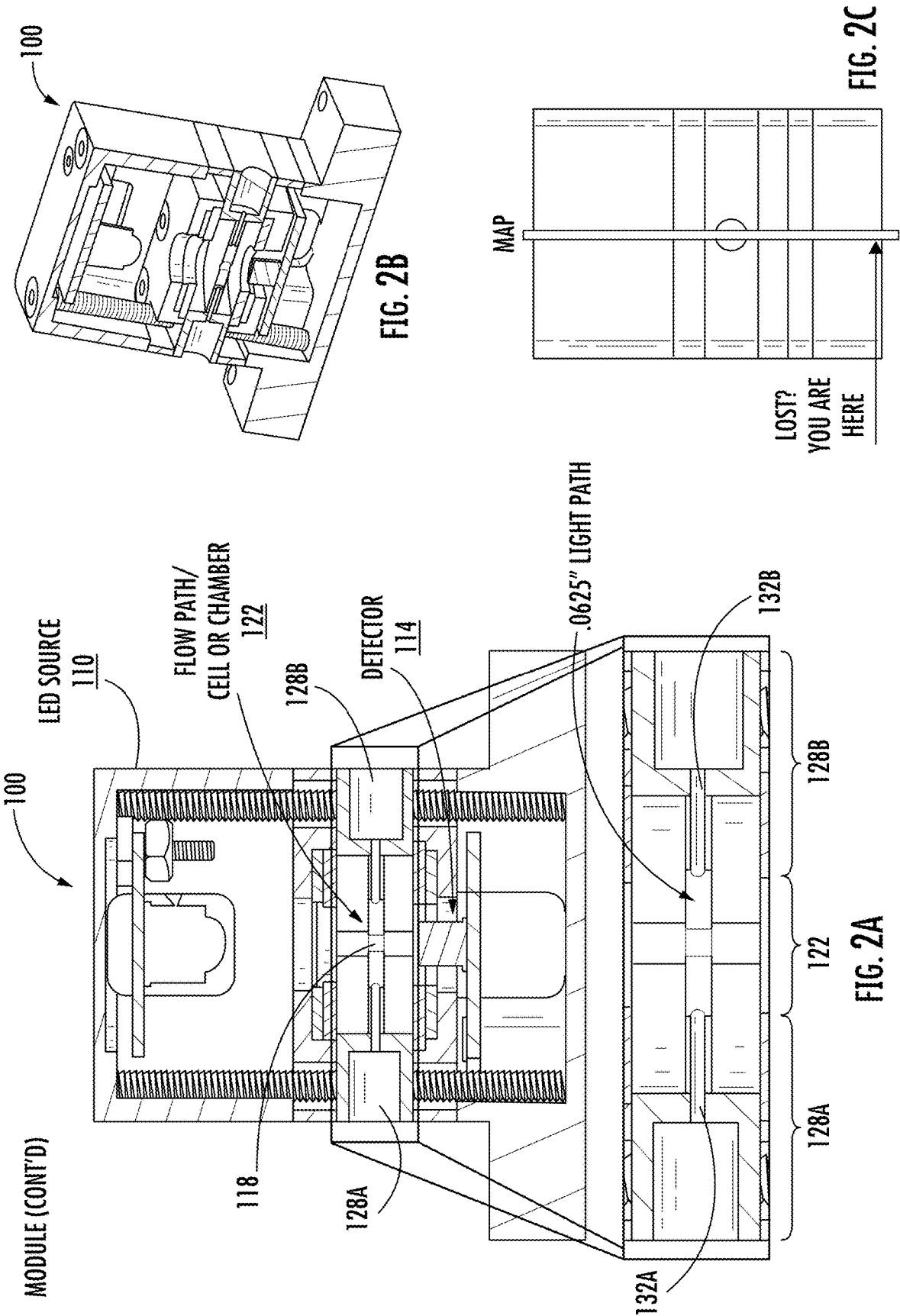
FIGS. 2A, 2B, and 2C, provide additional cross-sectional views of the embodiment of FIGS. 1A, 1B. Inset of FIG. 2A illustrates internal contents of the chassis assembly in more detail. The location of a sectional plane for FIGS. 2A, 2B is indicated in FIG. 2C.
Figures 3A, 3B, 3C:
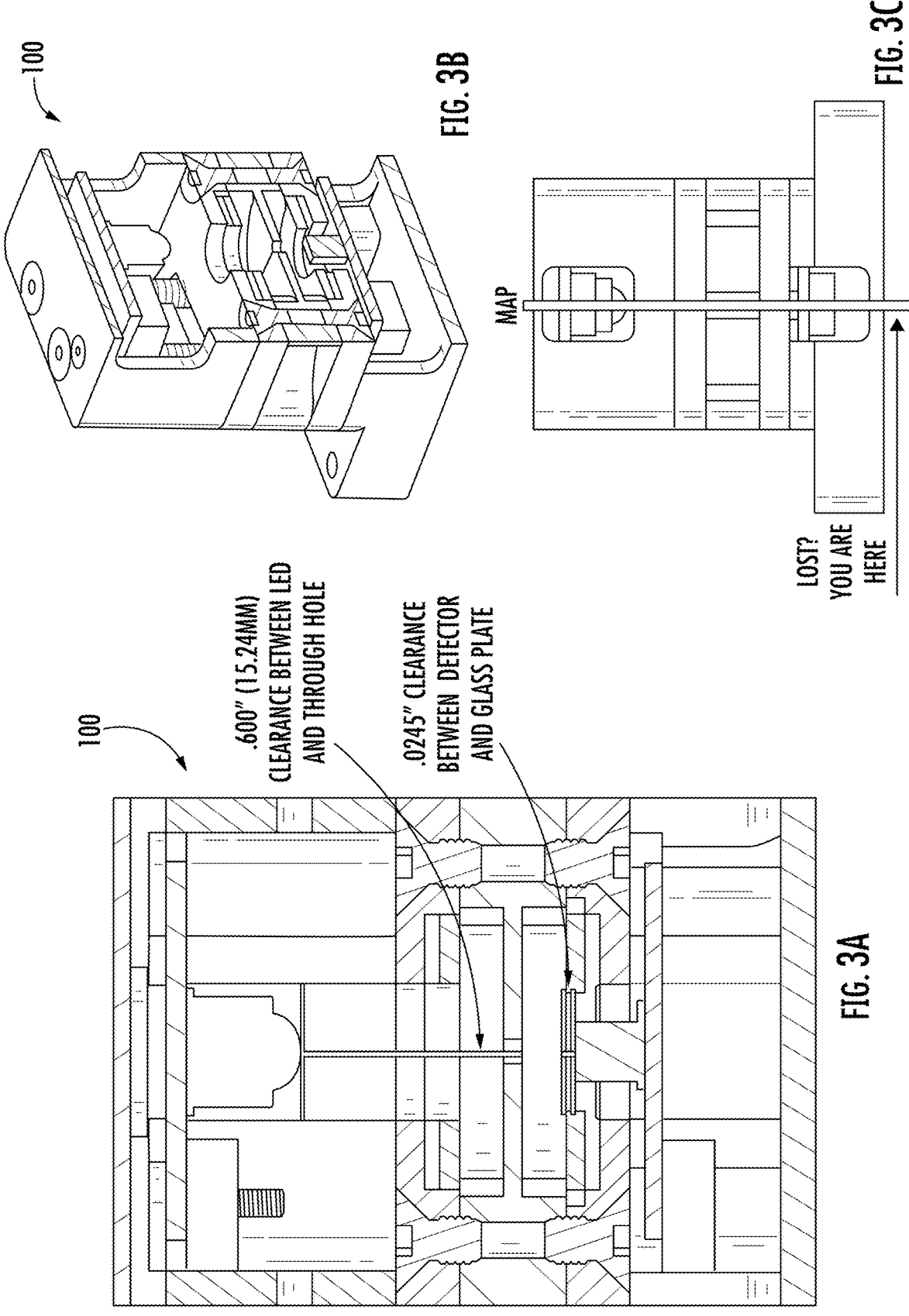
FIGS. 3A, 3B, and 3C, provide yet additional cross-sectional views of the embodiment of the photometric apparatus of FIGS. 1A, 1B. The location of a sectional plane for FIGS. 3A, 3B is indicated in FIG. 3C.
Figure 6A:
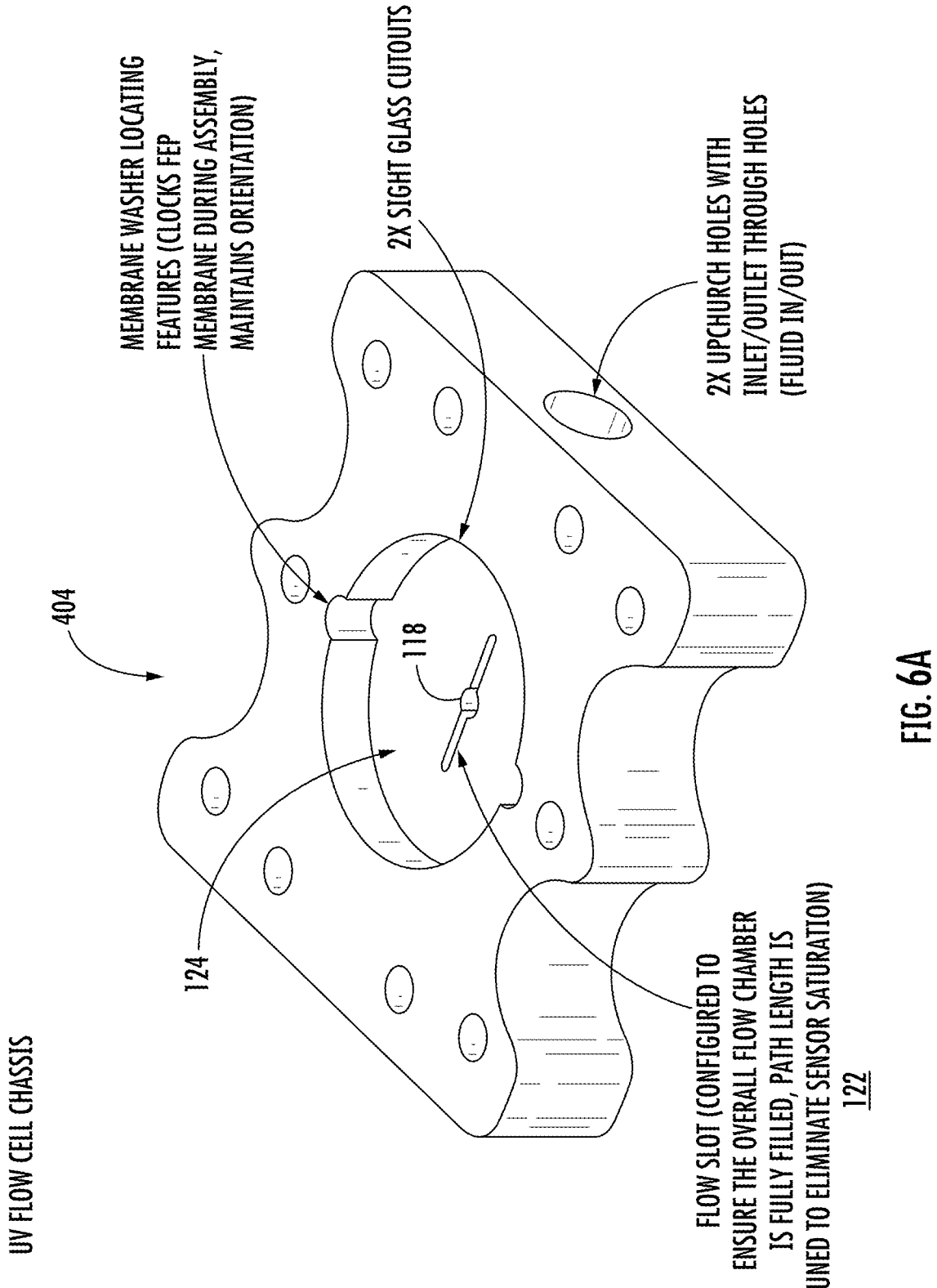

In reference to FIG. 2A and the corresponding inset, one portion of the overall housing structure—the upper housing portion 108A as shown here—is configured to support a source of light 110 therein (here, and LED source of UV light) oriented such that a beam of light produced by the source 100 substantially freely and without vignetting passes through an aperture 118 formed throughout the chassis assembly (see FIGS. 2A, 6A) towards the counter-positioned optical detection system (shown here as an optical detector 114), which is appropriately affixed in the opposing portion of the housing (here, the bottom housing portion 108B). The operation of at least the source of light 110 and the optical detection system can be governed by electronic circuitry (a processor, for example; not shown) that is appropriately programmed to initiate the photometric process and correct optical date from the optical detection system In reference to FIGS. 2A, 4A, 4B, 6A, the chassis assembly 104 includes a substantially optically opaque substrate 404 (interchangeably referred to herein as a UV flow cell chassis) that is judiciously dimensioned to define the throughout slot/flow path 122. Such slot/flow path 122 forms a portion of the volume of a fluidic chamber that, in operation of the module 100, contains the target fluid subject to a photometric measurement with the use of the source of light 110 and the detector 114 that is performed through the aperture 118. It is understood that the (optionally shaped as a cylindrical channel) throughout aperture 118, the cross-sectional dimension of which is larger than that of the slot 122, defines a corresponding trench or channel in a corresponding surface of each of the two substantially planar and facing each other walls of the slot 122. The substrate (or flow cell chassis) 404 in implemented with recesses 124 formed on each of the sides of the substrate 404 (only one recess 124—at the top of the substrate 404—is clearly seen in FIGS. 6A, 6B, for example; the other recess 124 is formed on the opposite (bottom, as shown) side of the plate 404). The recesses 124 are judiciously dimensioned to accept and contain respective optically-transparent windows or plates 408 (in one case made of fused quartz or quartz glass) which, when placed in and sealingly cooperated with the recesses 124, limit and bound the slot 122 from both sides (in a substantially parallel fashion) and thereby define the flow chamber and corresponding volume through which the target fluid is passed (along an axis transverse to the axis connecting the LED 110 and the optical detector 114) for a photometric/spectrophotometric measurement.

Figures 4A, 4B:
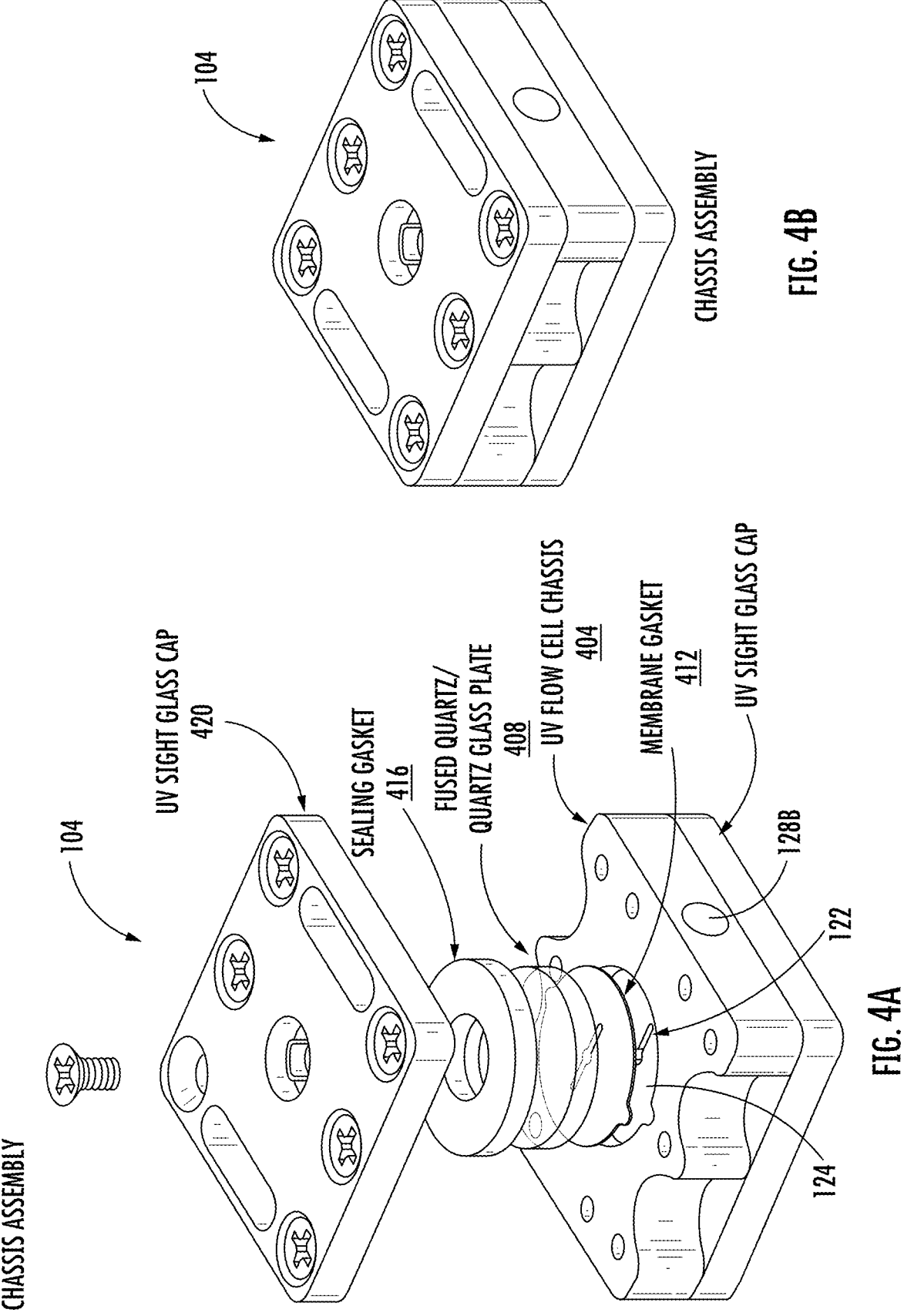
FIGS. 4A, 4B provide schematic illustrations of an embodiment of the chassis assembly portion of the apparatus of FIGS. 1A, 1B.
Figures 5A, 5B:

Referring again to FIGS. 4A, 4B, the process of fluidly sealing, in a substantially leak-proof manner, of the fluidic chamber of the chassis assembly 104 may be accomplished in at least one implementation with the use of a membrane gasket 412 disposed between the optically transparent window or plate 408 and the bottom of the corresponding recess 124 (which membrane gasket 412, when present, may be configured to include a throughout slot substantially co-dimensional with the slot 122) and/or the sealing gasket 416 capping the plate 408. The stack of components 416, 408, and 412 in this case is positioned into the recess 124 and compressed with the use of affixing means such as bolts (as shown) or clamps (not shown), for example, and the cap (or cap plate) 420 to form a fluid seal around the volume of the slot 122 thereby completing the fluid chamber of the chassis assembly 104. The same operation is performed on the opposite (bottom, in this case, as shown in FIG. 4A) side of the flow cell chassis 404. An example of the embodiment of the cap plate 420 and its structure is discussed in FIGS. 5A, 5B, 5C. In operation, light from the source of light 110 is delivered to the detector 114 through the central aperture of the upper and lower cap plates 420, through both optical windows, and through the volume of the fluidic chamber.

Referring again to FIGS. 2A, 2B, 4A, 4B, the fluidic inlet and outlet 128A, 128B leading to the volume of the chamber of the chassis assembly 104 form operably-interchangeable inlet and outlet. Notably, the inlet/outlet 128A, 128B are structured to have cross-sectional dimensions (as viewed in planes substantially perpendicular to the axes of the inlet/outlet) that are not constant along these axes. Specifically, as shown in the inset of FIG. 2A, the portions 132A, 132B of each of the inlet/outlet paths 128A, 128B that are proximal to, leading to, and merging with the throughout slot 122 have a corresponding cross section of a size smaller than that of the outer (distal to the slot 122) portions of the corresponding inlet/outlet path. Furthermore, it is preferred that the cross-sectional dimensions of the proximal portions 132A, 132B of the inlet/outlet 128A, 128B are made smaller than the minimum cross-sectional dimension of the slot 122 (and, therefore, the minimum separation between the first and second walls), to thereby cause the operationally preferred situation when the formation and/or entrapment of air-bubbles and/or stagnant fluid in the volume of the flow chamber (when the target fluid is delivered therein/therethrough) is minimized or even eliminated—at least in part by restricting the flow of the target fluid at the junction between the inlet path and the slot 122 and/or the junction between the outlet path and the slot 122. The relative cross-sectional dimensions of the portions 132A, 132B and those of the slot 122 and the aperture 118 can be compared based on the cross-sectional view of FIGS. 3A, 3B, 3C.

Overall, an implementation of the photometric apparatus of the invention has a flow chamber (flow cell, cuvette unit) that is structured for repeatable and volumetrically uniform fill-fix-in-space-measure-flush-and-re-use operation substantially without forming air bubbles in the flow chamber while, at the same time, providing target fluid (sample aliquots) that is spatially/geometrically constrained such as to ensure that a pathlength of light traversing the flow chamber (flow cell) installed in the photometric apparatus is substantially invariant (in time, for example).

Figure 7:
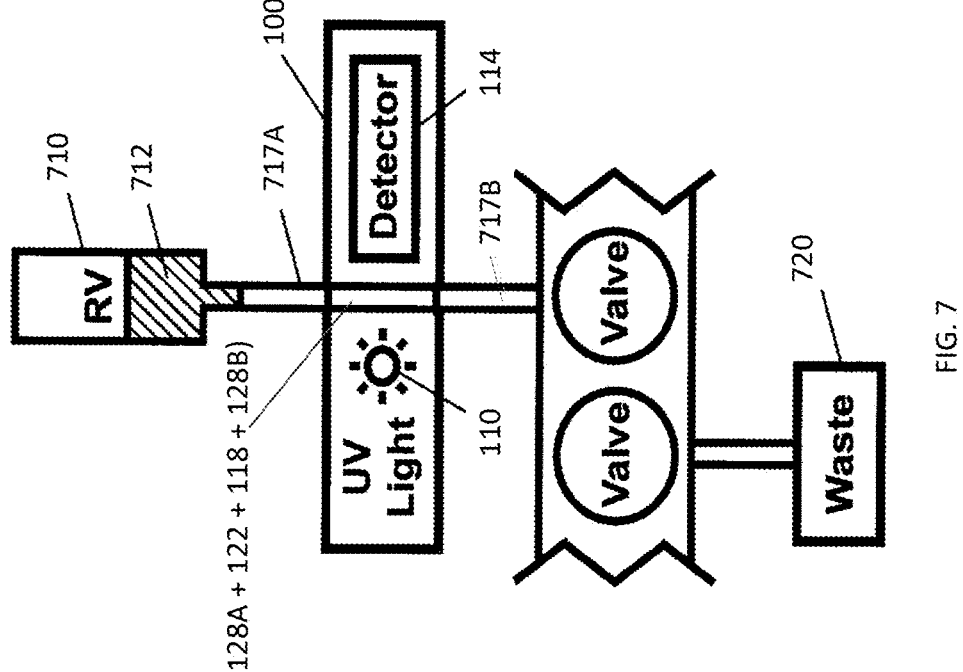
FIG. 7 illustrates schematically the overall system for deprotection monitoring using the UV light, which utilizes an embodiment of the current photometric apparatus.

In at least one implementation, the principle of operation of the overall apparatus that includes the module 100 may remain substantially the same as those discussed in U.S. Pat. No. 8,535,947. To this end, FIG. 7 schematically illustrates an embodiment 700 of the overall system (a peptide automated synthesizer) for real-time monitoring using UV light and control of the deprotection reaction structured to include an integrated (that is, internal to the system 700) monitoring apparatus 100. Reaction vessel (RV) 710 contains deprotection reagents 712. At specified time intervals, the deprotection reagents 712 are pushed (for example, with pressure produced by nitrogen) to be delivered the photometric measurement device 100. Optionally—and depending on particular geometry of the system 700—such delivery may be carried out through the lead channel 717A located proximally to the reaction vessel 710. The lead channel, when present, is mated with the inlet 128A. Optionally but preferably, the lead channel 717A—when present—is disposed directly below the reaction vessel 710 inside the synthesizer such that deprotection reagents 712 are partially maintained within the reaction vessel even after some portion of the reagents has been delivered to the fluid chamber of the chassis assembly and during the measurement. Upon conclusion of the measurement, the deprotection reagents are either returned to the reaction vessel 710 for further reaction with the solid-phase reactants or are sent to waste 720 if the reaction reaches completion or another stopping point as illustrated by the flow diagram of FIG. 8.

Figure 8:
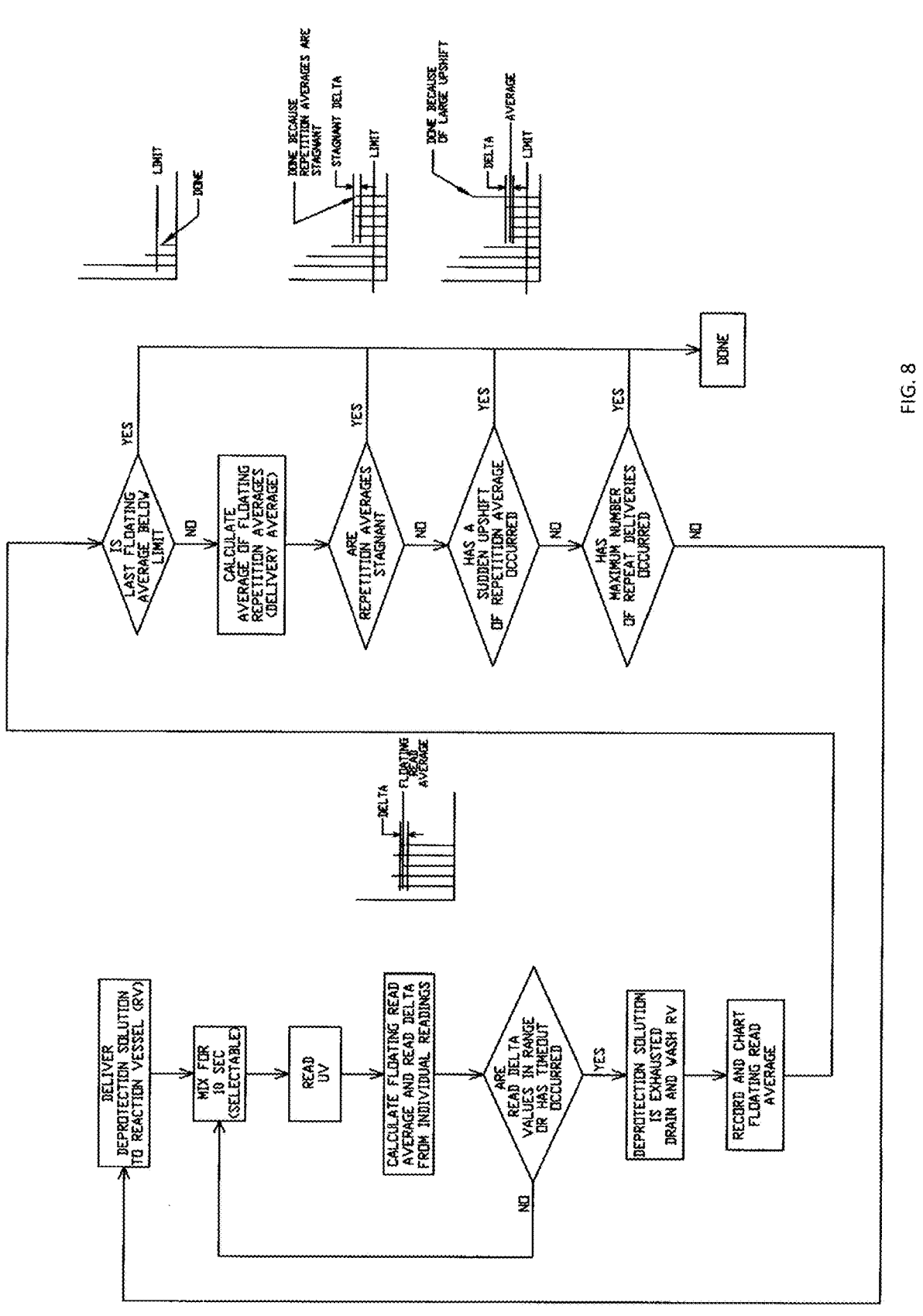
FIG. 8 presents a flow diagram of one embodiment of a method for the UV monitoring of deprotection reactions in accordance with the idea of the present invention.

Turning to applications of and methods involving the use of the photometric apparatus structured according to the idea of the invention, FIG. 8 shows a corresponding logic flow diagram. During each deprotection solution delivery, the deprotection solution is pushed down to the photometric apparatus UV sensor every 10 seconds as shown or an alternative time as selected by the user. The rate at which the reaction is progressing is determined by calculating a floating average of a specified number of previous readings. When the floating average does not change more than a pre-selected delta, the deprotection chemical is exhausted, no longer effective for the process, and the fluid is sent to waste and fresh deprotection solution is delivered. The skilled person will now readily appreciate that a specific implementation of the method for real time monitoring of a deprotection reaction of a Fmoc protecting group in a peptide automated synthesizer (equipped with the photometric apparatus discussed above) may generally may include at least a process of drawing a fluid (in one example—containing dibenzofulvene and related adducts and byproducts) from the reaction vessel of the synthesizer into a hollow volume of the photometric apparatus through the inlet passage formed in the flow cell chassis of the photometric, followed by irradiating such fluid in the hollow volume (with the chosen UV light) delivered along and between the first and second trenches formed on the inner side of the flow slot of the flow cell chassis and through a plate of an optically transparent material. Then follows the acquisition of optical data representing absorption of such UV light by the fluid and the process of determining a rate at which the deprotection reaction is progressing (for example, by calculating a floating average of a specified number of readings) with the use of an optical detector separated from the source of the UV light by the flow cell chassis and two plates of optically transparent material and a processor operably cooperated with such optical detector. Finally, upon the conclusion of the data acquisition process and the process of determination of the rate of the deprotection reaction, the fluid is returned to the reaction vessel through the outlet passage in the flow chassis of the photometric apparatus (unless the reaction completion is indicated when a value of the floating average does not change more than a preselected value during a user-defined time). Optionally, the time of the deprotection reaction may be extended based on a value determined from the optical data recorded during the process of acquisition.

In one non-limiting example of the use of the photometric apparatus with a peptide automated synthesizer, one of three UV-monitoring modes may be selected: (1) basic monitoring mode, which measures the extent of the deprotection reaction but does not adjust or otherwise change the synthesis reaction, (2) deprotection monitoring with feedback mode, which measures the extent of the deprotection reaction and uses that data to control the deprotection reaction times and repetitions, and (3) deprotection and coupling monitoring with feedback mode, which measures the extent of the deprotection reaction and uses that data to control the deprotection reaction times and repetitions, as well as to extend the coupling times, accordingly.

Thus, an on-line UV source and detector are provided that—when complemented with an appropriate processor—are configured to record data at specified time intervals during the deprotection reaction and not just at the end of it, which provides an automatic means for modifying deprotection times and repetitions based on the processes identified in the flow diagram of FIG. 8. It was empirically determined that the repeatability and consistency of the measurement results obtained with the use of the module 100 overall did not depend on variations in temperature and that transmittance of light at the target UV wavelength by each of the first and second plates exceeded 90 percent—thereby ensuring the predictability and control of the measurements.

The new and inventive aspects of the apparatus and methods of the invention are now readily apparent to a skilled person having the benefit of this disclosure. In addition to the advantages described above, real-time data collected with the use of a programmable processor (operably cooperated with an embodiment of the invention; not shown for simplicity of illustrations) during a synthesis can be used to contemporaneously with the synthesis process to generate visually-perceivable representations (for example, graphs and/or images, presented in at least one case on a monitor) of individual deprotection and/or coupling reactions or overall summaries for a synthesis. Moreover, difficult reaction steps can be identified during as well as after a synthesis.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention. Within this specification, embodiments have been described in a way that enables a clear and concise specification to be written, but it is intended and will be appreciated that embodiments may be variously combined or separated without parting from the scope of the invention. In particular, it will be appreciated that all features described herein are applicable to substantially all aspects of the invention.

In addition, when the present disclosure describes features of the invention with reference to corresponding drawings (in which like numbers represent the same or similar elements, wherever possible), the depicted structural elements are generally not to scale, and certain components are maybe enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing may not, generally, contain all elements of a particular view or all features that can be presented is this view, at least for purposes of simplifying the given drawing and discussion, and directing the discussion to elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

A "real-time" performance of a system is defined and understood as performance that is subject to operational deadlines from a given event to a system's response to that event. For example, a real-time extraction of contact information (such as optical data) from an optical detector may be one triggered by the user or the programmable processor and executed simultaneously with and without interruption of the process of acquisition of such data.

It is understood that, regardless of whether a particular reference to the use of a processor has been made in this disclosure, the implementation of the method of the invention may and preferably does include a processor controlled by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described specific non-limiting embodiments, it will be understood by those of ordinary skill in the art that modifications to, and variations of, the illustrated embodiments may be made without departing from the inventive concepts disclosed herein. The disclosed aspects may be combined in ways not listed above. Accordingly, the invention should not be viewed as being limited to the disclosed embodiment(s).

The invention claimed is:

1. A method for real time monitoring of a deprotection reaction of an Fmoc protecting group, the method comprising steps of:

monitoring of the deprotection reaction of the Fmoc protecting group, in a peptide automated synthesizer that contains (i) an apparatus including:

a substrate of optically opaque material;

a hollow volume limited by:

a first substantially planar wall formed in the substrate, sthe first wall containing a first trench that is defined on a surface of the first wall and that connects a top of the first wall with a bottom of the first wall, a second substantially planar wall formed in the substrate, the second wall containing a second trench that is defined on a surface of the second wall and that connects a top of the second wall with a bottom of the second wall, the second wall being substantially parallel to the first wall, a first plate of an optically-transparent material positioned across and connecting the top of the first wall and the top of the second wall in a substantially leak-proof manner, a second plate of the optically-transparent material positioned across and connecting the bottom of the first wall and the bottom of the second wall in a substantially leak-proof manner, and inlet and outlet formed in the substrate along at least one of the first and second plates and fluidly connected with one another through the hollow volume, wherein the apparatus is configured to carry out a photometric measurement of a target fluid, placed between the first and second trenches, in the peptide automated synthesizer;

and (ii) a reaction vessel by at least:

(a) drawing a fluid containing dibenzofulvene and related adducts and byproducts from the reaction vessel into the hollow volume through the inlet, (b) irradiating the fluid in the hollow volume with UV light at a wavelength of about 301 nm delivered along and between the first and second trenches from the first plate to the second plate, (c) acquiring optical data representing absorption of the UV light by the fluid and determining a rate at which the deprotection reaction is progressing by calculating a floating average of a specified number of readings; and (d) returning the fluid to the reaction vessel through the outlet unless a reaction completion is indicated when a value of the floating average does not change more than a preselected value during a user-defined time.

2. A method according to claim 1, wherein the drawing a fluid from the reaction vessel is carried out during the deprotection reaction.

3. A method according to claim 1, wherein steps (a) through (d) are performed at specified time intervals during the deprotection reaction.

4. A method according to claim 1, further comprising extending time of the deprotection reaction based on extension time determined from the optical data recorded during the acquiring in step (c).

5. A method according to claim 1, further comprising repeating the deprotection reaction based on the optical data recorded during the acquiring in step (c), with the optical data being used to determine an extent of completion of the deprotection reaction.

6. A method according to claim 1, further comprising extending time of an amino acid or monomer coupling reaction subsequent to the deprotection reaction based on time of the deprotection reaction.

7. A method according to claim 1, further comprising providing a visually-perceivable output representing the optical data during a process of synthesis.

8. A method according to claim 7, wherein the visually-perceivable output comprises a graphical synthesis summary and/or a graphical representation of an individual deprotection reaction.

9. A method according to claim 1, further comprising:

avoiding formation of an air-bubble in the hollow volume during the drawing the fluid at least in part by passing the fluid though a first portion of the inlet that is distal to the hollow volume and that has a first cross-sectional dimension, followed by passing the fluid through a second portion of the inlet that is proximal to the hollow volume and that has a second cross-sectional dimension, wherein the second cross-sectional dimension is necessarily smaller than the minimum separation between the first and second substantially planar walls, and wherein the first cross-sectional dimension is larger than the second cross-sectional dimension.

10. A method according to claim 9, wherein the returning the fluid to the reaction vessel includes passing the fluid though a first portion of the outlet that is proximal to the hollow volume and that has a third cross-sectional dimension followed by passing the fluid through a second portion of the outlet that is distal to the hollow volume and that has a fourth cross-sectional dimension, wherein the third cross-sectional dimension is necessarily larger than the minimum separation between the first and second substantially planar walls, and wherein the fourth cross-sectional dimension is larger than the third cross-sectional dimension.

11. A method according to claim 1, wherein the irradiating the fluid includes traversing the fluid in the hollow volume with a beam of the UV light that has a cross-sectional dimension larger than a separation between facing each other planar portions the first and second substantially planar walls.

12. A method according to claim 1, wherein the synthesizer includes a source of the UV light, and a UV light detector within the synthesizer.

13. A method according to claim 1, wherein the returning the fluid to the reaction vessel includes passing the fluid though two different portions of the outlet that have different cross-sectional dimensions.

14. A method according to claim 1, wherein step (c) includes transforming, with a use of a processor configured to determine a rate at which the deprotection reaction is progressing in the fluid, the optical data into a visually-perceivable image of an individual deprotection reaction.

15. A method according to claim 1, further comprising: delivering a fresh deprotection solution to the reaction vessel if the rate at which the deprotection reaction is progressing does not change by more than the preselected value during the user-defined time.

16. A method according to claim 1, wherein the irradiating includes irradiating the fluid with the UV light through a plate of the first plate and the second plate.

* * * * *